: 2,935,701
Patented May 3, 1960

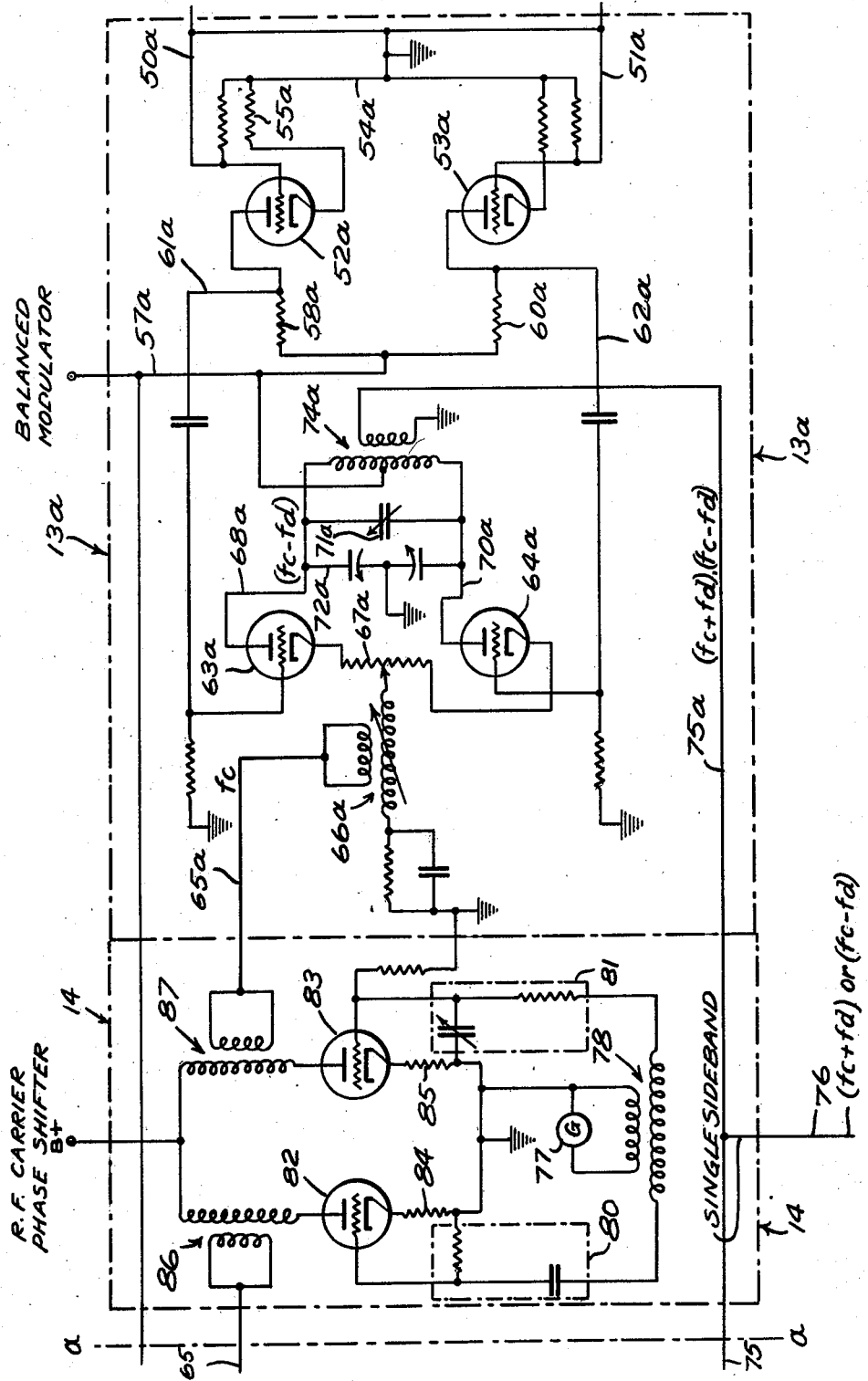

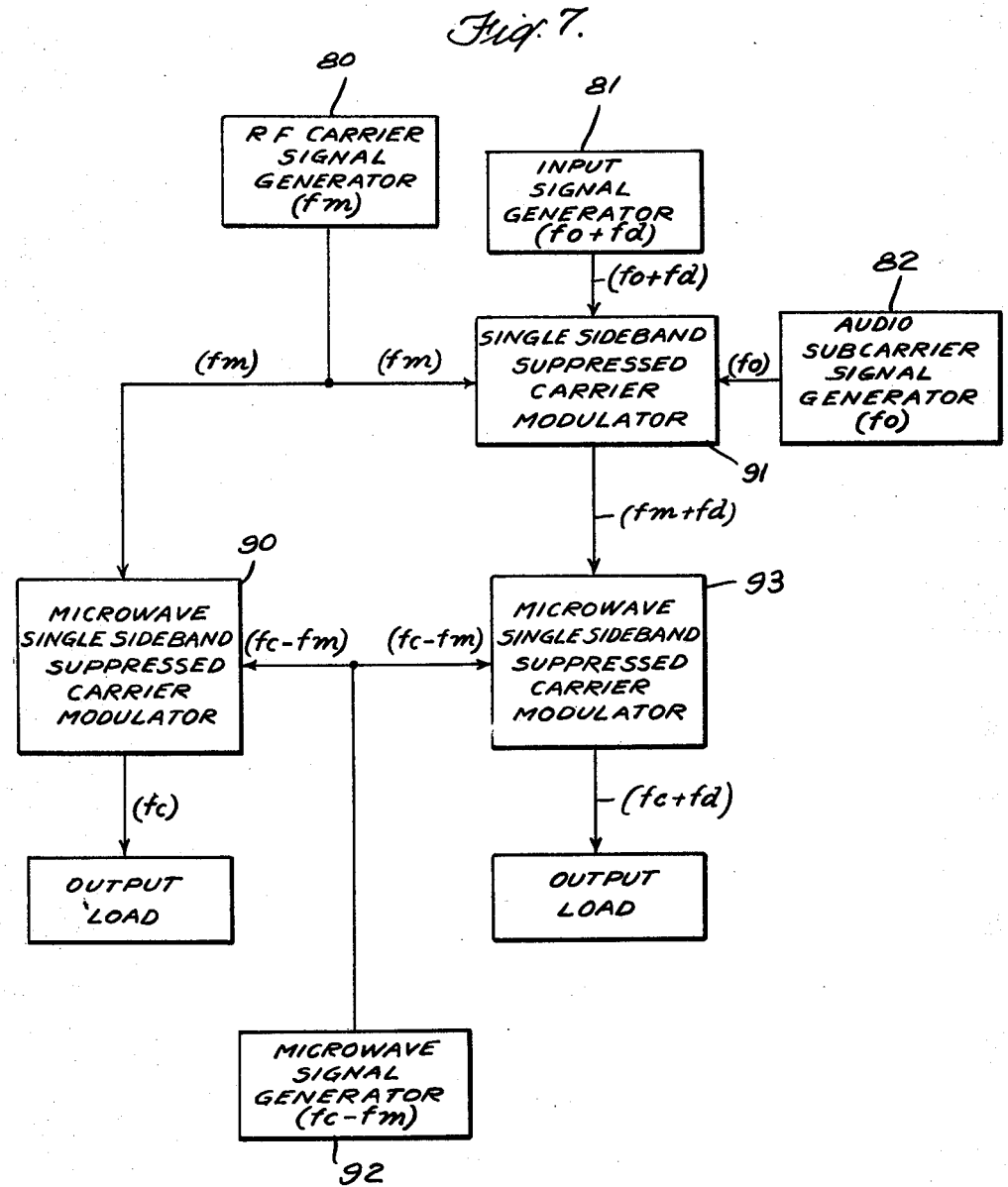

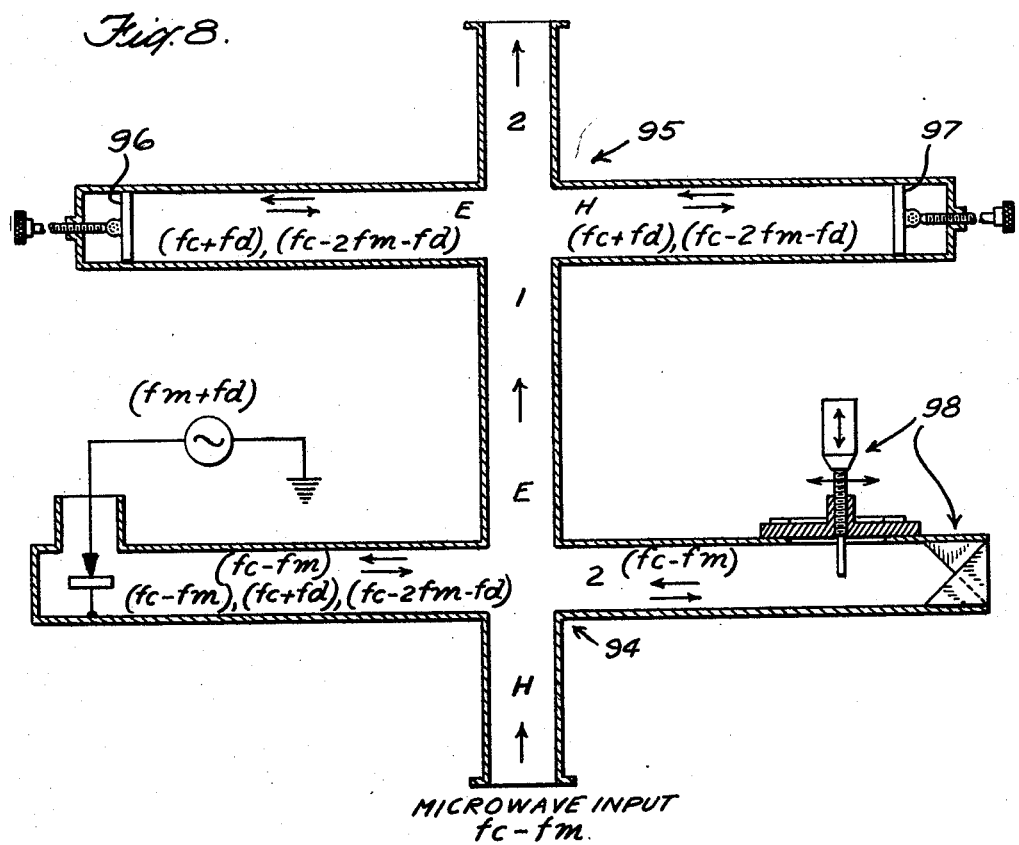

2,935,701

MICROWAVE DOPPLER SIGNAL SIMULATOR

Herbert L. Robinson, Jamaica, Charles I. Smith, Kew Gardens, and Mack M. Zimet, Brooklyn, N.Y., assignors to Sperry Rand Corporation, Ford Instrument Company Division, Long Island City, N.Y., a corporation of Delaware Application April 21, 1958, Serial No. 729,759

3 Claims. (Cl. 332—45)

This invention relates to frequency control devices and particularly to microwave and electronic frequency control units which are adapted to produce simulated doppler shift in carrier frequencies.

Previous methods for producing simulated doppler signals included inter alia the utilization of such devices as ferrite modulators and traveling wave tubes. These modulators are incapable of providing a signal of more than 30 db output signal to noise ratio. In addition these aforementioned devices do not produce a true doppler shift inasmuch as the average frequency of the output remains unchanged. The devices arranged in accordance with this invention yield signal to noise ratios of 40 db or greater and, additionally, assure a one to one correspondence between the frequency shift of the carrier frequencies and that of the modulating signals, and produce a true doppler shift.

In general, this invention contemplates the provision of electronic and microwave components which are arranged to mix a low frequency signal, whose frequency is the amount of doppler shift desired with a radio frequency signal so as to produce a single sideband radio frequency signal, associated components being provided to mix the resulitng radio frequency signal with a microwave frequency signal so as to generate two sideband frequencies on each side of the carrier frequency differing therefrom by an amount equal to the frequency of the doppler signal. The devices also include means for selectively suppressing one of the sideband signals so that the desired doppler frequency shift effect may be achieved.

One object of the invention is to provide efficient phase shifting of an audio frequency signal over a wide range.

Another object of the invention is to provide electronic means for affording efficient low frequency modulation of radio frequency carriers.

Another object of the invention is to provide an arrangement of microwave components which operate to give small frequency shifts of a microwave carrier signal.

Other objects and advantages of the invention may be appreciated on reading the following detailed description which is taken in conjunction with the accompanying drawings, in which:

Fig. 6 is a schematic diagram showing a radio frequency signal generator and phase shifter and a radio frequency modulator adapted to receive phased doppler signals;

Fig. 7 shows a schematic assembly of a microwave doppler signal simulator arranged in accordance with the invention;

Fig. 8 is an elevation in section of a microwave suppressed carrier single sideband modulator, and Fig. 9 is a diagram illustrating possible combinations of sideband and generator frequencies to obtain the desired simulated doppler shifted frequency output.

Figure 1:
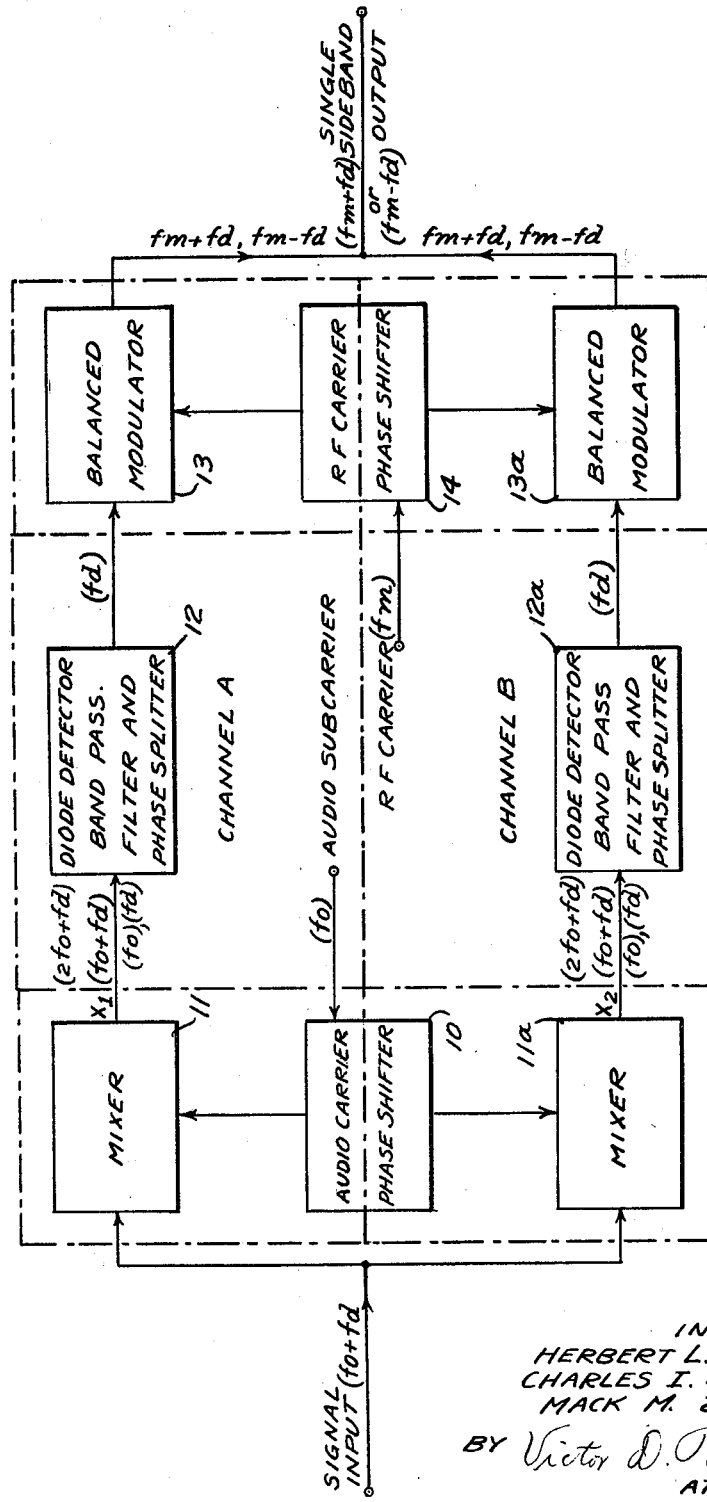
Fig. 1 is a block diagram of a radio frequency single sideband suppressed carrier modulator.

Referring to the block diagram of Fig. 1, it is seen that the radio frequency doppler shift simulator may comprise electronic components exclusively, the components being arranged according to the broad concept of the invention. In accordance therewith, there is provided an audio carrier phase shifter 10 having a dual output connected into separate channels, one of the channels being designated channel A and the other channel B. The two channels have identical components. Immediately connected to the audio carrier phase shifter 10 are mixers 11 and 11a disposed, respectively, in channel A and in channel B. The mixers have separate input leads which are adapted to receive a selected signal of frequency $(f_o+f_d)$, where $(f_o)$ is the frequency of an audio subcarrier and $(f_d)$ is the frequency of the desired doppler shift. The mixers are balanced units and are adapted to combine the audio subcarrier $(f_o)$, and signal input $(f_o+f_d)$, so as to form a modulated audio subcarrier frequency, in both channels. This frequency is then introduced in each channel to electronic units 12 and 12a having a detector, band pass audio filter and phase splitter where the combined frequencies in the two channels are demodulated and filtered and the resulting doppler frequency, $(f_d)$, is split into a dual or push-pull output signal. The doppler frequencies in each of the two channels are then connected into balanced modulators 13 and 13a disposed in each channel and connected to a radio frequency carrier phase shifter 14. The balanced modulators function to combine the carrier frequency with the doppler frequency thus producing double sideband signals of a doppler modulated radio frequency. The output leads from the balanced modulator in each channel are joined to a common output lead on which there is produced a single sideband signal selected according to the setting of the audio frequency phase shifter 10 and the radio frequency phase shifter 14.

Figure 2:
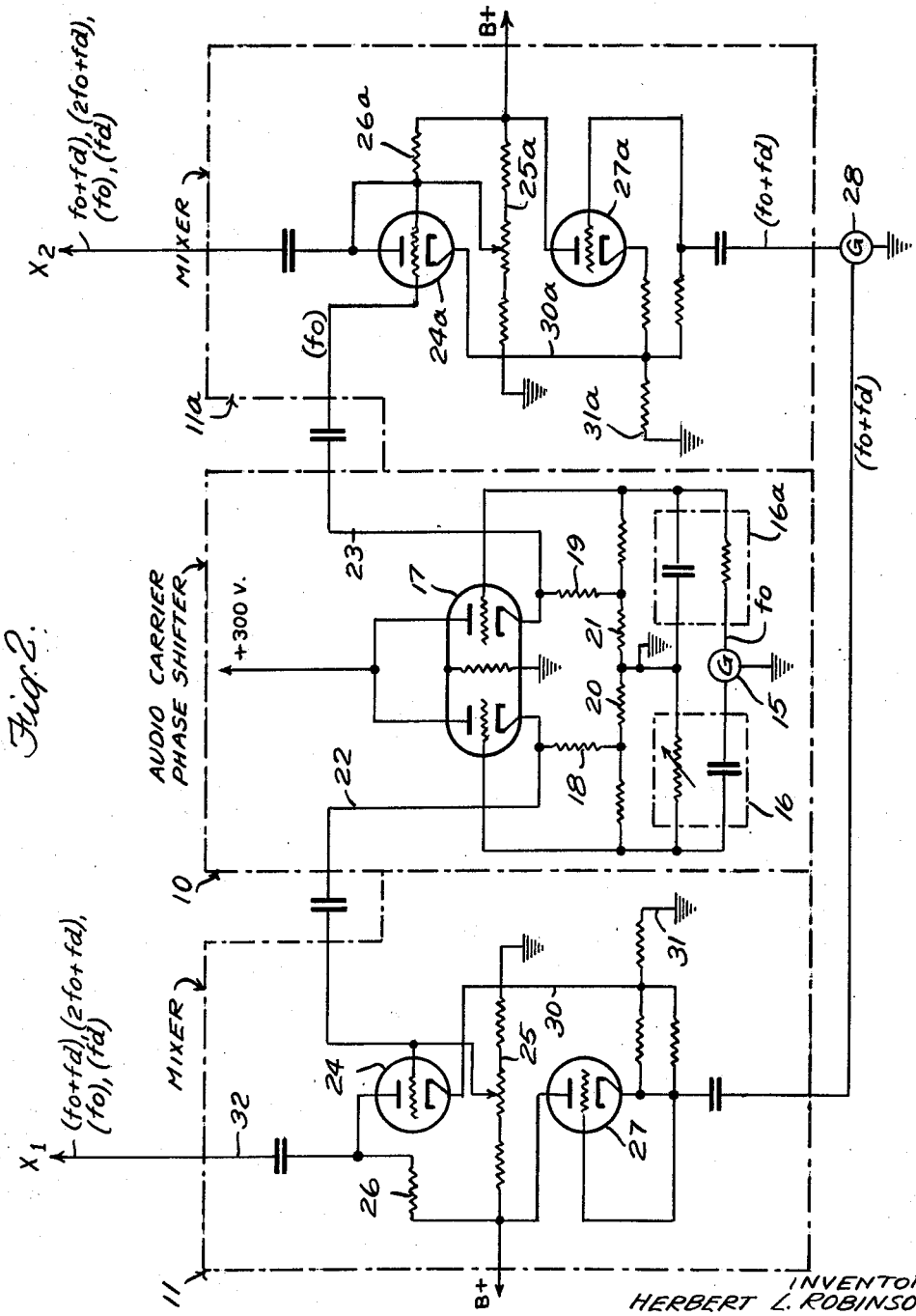
Fig. 2 is a schematic diagram of the wideband audio phase shifter which is adapted to produce two signals of doppler shift frequencies with a fixed phase relation between said signals.

As shown in Fig. 2, the audio carrier phase shifter 10, comprises audio frequency generator 15, across which there is disposed an adjustable phase shifter 16, and fixed phase shifter 16a. A dual triode 17 is grid connected to the phase shifters 16 and 16a, respectively. The cathode electrodes of the dual triode are connected through cathode resistors 20 and 21 and bias resistors 18 and 19 to ground. Cathode follower leads 22 and 23 from the dual triode 17 receive the frequencies $(f_o)$ which are employed to control the grids of triodes 24 and 24a in the mixers 11 and 11a, respectively. The mixers 11 and 11a being identical in composition only one of the units will be described, corresponding elements in the mixer of the other channel being assigned the same reference numeral with an *a* suffixed thereto. The control grid of the triode 24 is biased by virtue of its adjustable connection to lead 25 and the plate element is connected through resistor 26 to a conventional B+ supply. The control grid of the triode 27 is connected to an audio frequency generator 28 which introduces the doppler signal input to the two mixers. A lead 30 connecting the cathode element of triode 24 to the cathode element triode 27 serves to bias the cathodes of the two triodes 24 and 27, and is connected to ground through resistive lead 31.

Figure 3:
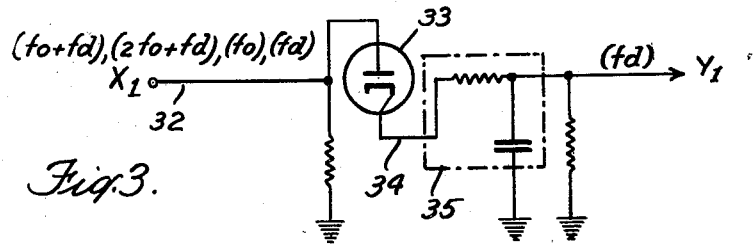
Fig. 3 is a schematic diagram of the detector employed in the two channels of the device.

As shown in Fig. 3 the mixer output carrying the modulated audio carrier frequencies $(f_o+f_d)$, $(2f_o+f_d)$, $(f_o)$ and $(f_d)$, on lead 32 is then introduced into a diode detector 33 which is disposed in each channel and which operates to pick off the audio or doppler frequency $(f_d)$. This frequency is placed on output lead 34 which is connected across a resistance-capacitance filter 35.

Figure 4:
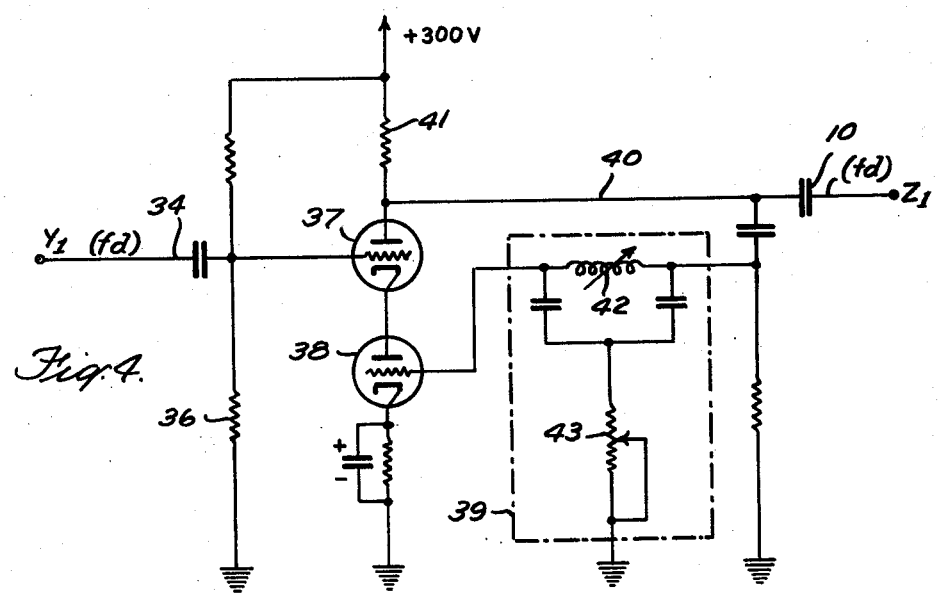
Fig. 4 is a schematic diagram showing one of the two identical band pass audio filters employed in the two channels.
Figure 5:
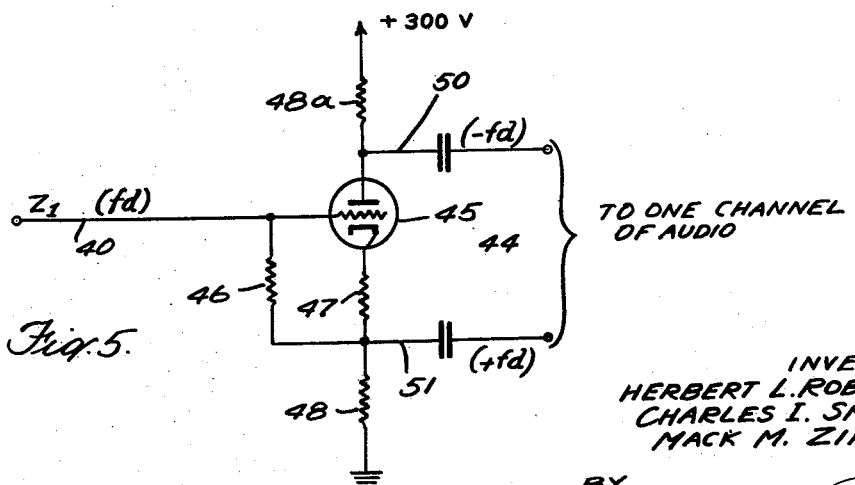
Fig. 5 is a schematic diagram of one of the phase splitters.

There is provided in each of the channels to receive the output of the detectors a band pass audio filter which is shown in Fig. 4. The output lead 34 in conjunction with grid resistor 36 is employed to control the grid of triode 37 in the audio filter, a cathode element of which is connected to ground through a second triode 38 and a tuning unit 39. The filter output lead 40 is connected between the plate element of the triode 37 and plate resistor 41 therefor. It is apparent that the operation of the triode 37 is controlled by the impedance of the triode 38. An inductance-capacitance-resistance tuning device 39 connected between the output lead 40 and the grid of the triode 38 is used to control the impedance of the latter and hence the output frequency permitted to pass on lead 40. Adjustment of tuning unit 39 is afforded the device by virtue of variable inductance 42 and variable resistor 43.

The output on lead 40 is introduced to a phase splitter 44 which is provided in each of the channels. Accordingly, the lead 40 is joined to the grid of a triode 45 having a grid resistor 46 and a bias resistor 47 connected to the grid resistor 46 and to a cathode resistor 48, and a plate resistor 48a equal in resistance to 48. Plate lead 50 and cathode follower lead 51 receive the push-pull output of the device which has the input frequency $(f_d)$. The signals of the push-pull output are of opposite phase and are designated $(-f_d)$ on plate lead 50 and $(+f_d)$ on cathode lead 51. The leads 50 and 51 and their corresponding leads 50a and 51a in the second channel are employed to introduce the push-pull doppler frequencies to the balanced modulators 13 and 13a, respectively. The two modulators 13 and 13a being identical in construction, the description of one will suffice, the corresponding elements in the other modulator being given the same reference numerals with an a suffixed thereto.

Figure 6A:
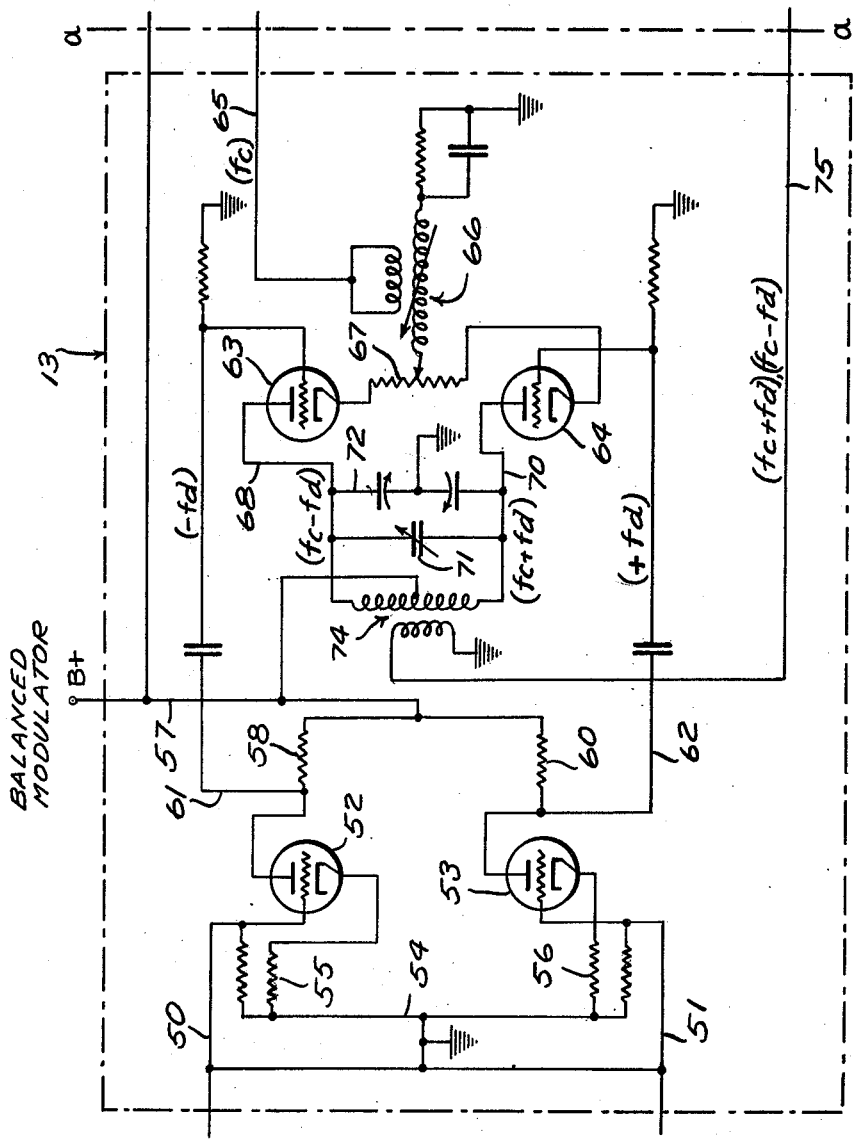
Fig. 6a is a schematic diagram of a radio frequency modulator adapted to receive phased doppler signals.

As shown in Fig. 6a the balanced modulator 13 comprises a pair of triodes 52 and 53, the grids of which are controlled by the doppler signal on leads 50 and 51. The cathode electrodes of the triodes are connected to the lead 54 through resistors 55 and 56. The plate elements of the triodes 52 and 53 are connected to a conventional B+ supply on lead 57 having plate resistors 58 and 60, respectively, connected to the supply lead 57. Output leads 61 and 62 of the triodes 52 and 53, respectively, serve to control the grid elements of a second pair of triodes 63 and 64, respectively. Additionally, the conductance of the second pair of triodes is controlled by the output of the radio frequency phase shifter 14 described below. The output of the latter on lead 65 is employed to control the cathode electrodes of the triodes 63 and 64 through variable transformer 66 and resistor 67 shared by the two cathodes. It is thus seen that the output of the two plate electrodes on plate leads 68 and 70 are adapted to receive the double sideband signals of frequencies $(f_c-f_d)$ and $(f_c+f_d)$. The magnitude of these signals are balanced by means of the capacitive lead 72 connected across the plate output leads 68 and 70. A transformer 74 having a center tapped primary connected to the plate leads 68 and 70 and across capacitor 71 is provided to place the double sideband frequencies on output leads 75 and 75a which are joined to the common output lead 76 which is adapted to carry a single sideband frequency selected by the audio phase shifter 10 and the radio frequency phase shifter 14. The center tap of said primary is connected to the B+ supply.

As shown in Fig. 6 the radio frequency phase shifter 14 comprises generally a radio frequency generator 77 across which there is connected the primary of adjustable transformer 78. Phase shifters 80 and 81 receive the carrier frequency impressed on the secondary winding of the transformer 78. Grids of triodes 82 and 83 are connected to receive the output of the phase shifters 80 and 81, respectively. The cathode elements of the triodes 82 and 83 are connected through resistors 84 and 85 to ground. Primary windings of transformers 86 and 87 are connected between the plate electrodes of the triodes 82 and 83, respectively, and a conventional B+ supply. The secondaries of the transformers 86 and 87 are connected to the output leads 65 and 65a serving to convey the phase adjusted carrier frequency to the balanced modulators. By proper phase adjustment, in conjunction with the phase adjustment of audio phase shifter 10, the desired sideband frequency $(f_c+f_d)$ or $(f_c-f_d)$ is introduced to the output lead 76.

In accordance with the invention, the achievement of the doppler signal may be effected by the employment of microwave components in conjunction with an electronic modulator. As shown in Fig. 7, a generator 80 is employed to introduce a modulation signal $(f_m)$ into a microwave single sideband suppressed carrier modulator 90 and a radio frequency sideband suppressed carrier modulator 91. The microwave modulator 90 of the sort required in the present microwave doppler simulator is described in detail in patent application Serial No. 728,367, filed April 14, 1958. A second input for the modulator 91 is made available by an input signal generator 81 which is adapted to introduce the doppler signal $(f_o+f_d)$. A third signal input is made available to the modulator 91 by an audio subcarrier signal generator 82 which is adapted to introduce the audio subcarrier signal $(f_o)$. The modulator 91 which functions to suppress the carrier frequency $(f_o)$ and to produce the single sideband frequency $(f_m+f_d)$ may take the form as shown in Figs. 1 through 6a.

A microwave signal generator 92 is adapted to introduce the combined signal frequency $(f_c-f_m)$ to the microwave modulator 90 and an identical, second microwave modulator 93. As described in detail in the patent application referred to above and shown in Fig. 8 herein, the microwave single sideband suppressed carrier modulator may take the form of a pair of microwave components known as magic tees. In magic tee 94, the carrier signal of frequency $(f_c-f_m)$ is suppressed by adjustment of variable mismatch 98 and the two sidebands of the carrier frequency $(f_c+f_d)$ and $(f_c-2f_m+f_d)$ are introduced to the second magic tee 95. The E and H arms of the magic tee 95 serve as channels for the two sidebands and are used to select by adjustment of the variable mismatches 96 and 97 one of the sidebands as desired, the E and H arms thereby serving the same purpose as the two channels in the electronic modulator described above which also serve to suppress the carrier and one of the sideband frequencies.

Using the same arrangement as shown in Fig. 7 of electronic and microwave components, it is possible to produce either of the desired sideband frequencies $(f_c+f_d)$ or $(f_c-f_d)$ by selecting the proper sideband frequency $(f_m+f_d)$ or $(f_m-f_d)$ of the radio frequency single sideband modulator 91 and the proper microwave signal frequency $(f_c-f_m)$ or $(f_c+f_m)$ from generator 92. The combination of input frequencies to the microwave modulator 93 to achieve the desired doppler shifted carrier frequency is shown in Fig. 9.

Additionally, the microwave doppler signal simulator is adapted to make available to the output load the carrier frequency $(f_c)$ produced in modulator 90 by the combination of the output signal $(f_c-f_m)$ or $(f_c+f_m)$ from generator 92 and the output signal $(f_m)$ from generator 80.

The modulation frequency $(f_m)$ may be of any convenient value within limits, and may be, for example, 30 mc. while the doppler frequency ($f_d$) may be an audio frequency, as for example 500 c.p.s.

Various other modifications in the embodiment of the invention may be effected by those skilled in the art without departing from the scope and principle of invention as defined in the following claims.

What is claimed is:

1. A microwave modulator adapted for generating simulated doppler frequencies and reference carrier frequencies comprising means for generating a radio frequency carrier, means for generating an audio frequency signal, means for generating an audio frequency subcarrier, a single sideband suppressed carrier modulator connected to said three generating means for summing the output of said generating means, a fourth generating means for producing a microwave carrier frequency, a microwave single sideband suppressed carrier modulator for combining the carrier frequency of said fourth generating means and the output of said single sideband suppressed carrier modulator into two carrier sideband frequencies and selectively yielding one of said sideband frequencies as an output and a second microwave single sideband suppressed carrier modulator for combining the carrier frequency of said fourth generating means and the output of said radio frequency carrier generating means to yield a reference carrier frequency as an output.

2. A microwave doppler signal simulator comprising means for generating a radio frequency carrier, means for generating an audio frequency signal, means for generating an audio frequency subcarrier and means connected to the three frequency generating means for suppressing the audio subcarrier frequency output of the audio frequency subcarrier generating means and combining the radio frequency with the audio signal so as to produce a single side band frequency, a microwave single side band suppressed carried modulator connected to the audio subcarrier suppressing and radio frequency-audio signal combining means and a microwave signal generator connected to said microwave single side band suppressed carrier modulator, said modulator being adapted to combine the radio frequency single side band with the output of said microwave signal generator and selectively yield a single side band of the output frequency of the microwave signal generator.

3. A microwave doppler signal simulator as defined in claim 2 wherein a second microwave single side band suppressed carrier modulator is connected to the radio frequency generating means and to the microwave signal generator, said second microwave modulator being adapted to suppress the radio frequency output of the radio frequency generating means and yield the microwave signal output produced by the microwave signal generator.

References Cited in the file of this patent
UNITED STATES PATENTS

| | | |
|---|---|---|
| 1,744,044 | Green | Jan. 21, 1930 |
| 2,173,145 | Wirkler | Sept. 19, 1939 |
| 2,808,504 | Neumann | Oct. 1, 1957 |